Aug. 15, 1967 D. BROUARD ET AL 3,336,437

COLOUR SIGNAL SWITCHING SYSTEM OF COLOUR TELEVISION RECEIVERS

Filed Dec. 28, 1964

INVENTORS.
DOMINIQUE BROUARD
CLAUDE RAGOT
By Kurt Kelman
Agent

United States Patent Office 3,336,437
Patented Aug. 15, 1967

3,336,437

COLOUR SIGNAL SWITCHING SYSTEM OF COLOUR TELEVISION RECEIVERS

Dominique Brouard and Claude Ragot, Levallois, France, assignors to Compagnie Francaise de Television, a corporation of France Filed Dec. 28, 1964, Ser. No. 421,169
Claims priority, application France, Dec. 26, 1963, 958,621
6 Claims. (Cl. 178—5.4)

The present invention has for its object to provide an improved circuit for the control of the colour channel switch of receivers adapted to operate in the "SECAM" colour television system, such as including the transmission, during checking periods, each of which is included in a vertical blanking interval, of auxiliary signals, the so-called identification signals. The identification signals are such that they allow the checking, and, if necessary the correction, of the operation of the colour channel two-state switch (directing to two different outputs the two alternately transmitted colour signals) in order to maintain its change of states in proper synchronism with those of the transmitter switch (by means of which one or the other of the two colour signals is selected for transmission).

In receivers of this type, the checking, and if need be, the correction of the phase of the receiver switch is effected by means of a signal, designated test signal, supplied by a video-frequency channel of the receiver, designated checked channel.

More precisely, it is an object of the invention to provide a receiver wherein the checked channel is the output channel of a matrix supplying thereto a test signal whose nature is such that the influence of noise signals on this test signal is in a very large measure eliminated.

Hereinafter, the term "active field period" will be used to designate each of the time intervals comprised between two successive vertical blanking intervals.

According to the invention, there is provided a receiver adapted to operate in a colour television system wherein the composite video signal comprises a luminance signal and a subcarrier which, during the active field periods, is alternately modulated by two colour signals A1 and A2 alternating at the line frequency, and which, during checking periods, each of which is included in a vertical blanking interval, is alternately modulated by two auxiliary signals, designated identification signals, $a1$ and $a2$, alternating at the line frequency, each of said identification signals being identical to itself for any two line periods of the checking periods, and the two identification signals being such that the difference $a1-a2$, throughout a line period, has a single polarity; the selective transmission of A1 and A2 during the active field periods, and $a1$ and $a2$ during the checking periods, being effected respectively in synchronism with the first state and second state of a transmitter switch passing regularly from one state to another at least between the beginning of each checking period and the end of the next active field period, said receiver comprising: a colour channel fed with said subcarrier, said colour channel being subdivided, at a point thereof, into two channels fed from a common input, one of said two channels, designated delay channel, comprising a delay device imparting to the signals propagated therethrough a delay, equal to the duration of a line period, relatively to the signals propagated through the other of said two channels, designated direct channel; a receiver switch having two signal inputs respectively coupled to the outputs of said direct and delay channel, at least one control input, and a first and a second output respectively assigned to colour signals A1 and A2; said receiver switch, during the active field periods, directing signal A1 to its first output and signal A2 to its second output or vice versa according to whether it is or is not in the same state (i.e. first state or second state) as the transmitter switch; a matrix having two inputs respectively coupled to the outputs of the receiver switch, said matrix being designed to supply, during said checking periods, a signal, referred to as a test signal, which is either of the form $k(a1-a2)$ or of the form $-k(a1-a2)$, where $k$ is a factor having a predetermined sign, according to whether the receiver switch is or is not in the same state as the transmitter switch; and a receiver switch controlling circuit having an input coupled to the output of said matrix, said switch controlling circuit comprising first means for causing the receiver switch to pass regularly from one state to another at the line frequency, and correcting means controlled by said test signal for, between the beginnings of two successive checking periods, either leaving the action of said first means to proceed unimpaired, or on the contrary modifying this action, according to whether, at the beginning of the first of said two successive checking periods, the test signal has the polarity, designated correct polarity, of signal $k(a1-a2)$ or the reverse polarity, designated incorrect polarity.

The invention will be better understood and other characteristics will become apparent by means of the following description and of the appended drawings, in which.

It will first be recalled that in the considered colour television system, the composite video signal comprises on the one hand a luminate signal, and on the other hand a subcarrier alternately modulated by two colour signals, A1 and A2, alternating at line frequency, with a smaller bandwidth than that of the luminance signal.

The invention will be described, as a non limitative example, under the following assumptions. The carrier is amplitude modulated and the subcarrier frequency modulated.

The transmitted luminance signal is the combination $Yw=0.59GW+0.30Rw+0.11Bw$, where $Gw$, $Rw$ and $Bw$ are respectively the primary colour signals, green, red and blue, obtained from the scanning circuits and with prior correction for gamma, and signals A1 and A2 are two signals respectively proportional to $(R-Y)$ and $(B-Y)$, where R, G, B and Y are the signals resulting from the same low-pass filtering effected respectively on the $Rw$, $Gw$, $Bw$ and $Yw$ signals. The proportionality coefficients are $k1=-1/0{,}70$ and $k2=1/0{,}89$.

Figure 1:
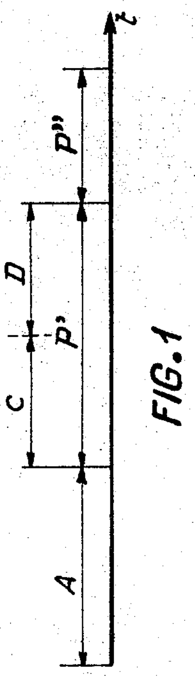
FIG. 1 is a time diagram showing the possible position of a checking period during a vertical blanking interval.

Each vertical blanking interval comprises a checking period which is included in this vertical blanking interval as shown in the time diagram of FIG. 1.

As regards the transmission of signals which modulate the carrier directly A (7 lines and a half) is the time provided for transmitting the "complete" field synchronization signal (including the preparation and equalization pulses), the next interval P′ (10 lines) corresponds to black level chopped by pulses at line frequency, and the last P″ (5 lines) to the transmission of standard signals also chopped by pulses at the line frequency.

As regards the sub-carrier, the checking period D then coincides in time with the second half (5 lines) of P′.

Figure 2:
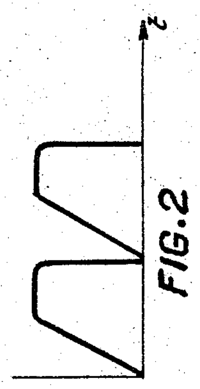
FIG. 2 illustrates one of the identification signals.

The two identification signals are of the form $a1=a$, $a2=-a$; signal $a$ comprises a positive signal, shaped as a rectangular trapezium, followed by a short zero level corresponding to the blanking line interval. Two consecutive signals $a1=a$ are shown in FIG. 2, of which, of course, only one will be transmitted, since signals $a1$ and $a2$ are alternately transmitted.

Before they are modulated on the sub-carrier, the signals A1 and A2 are subjected to a pre-emphasis of their upper frequency components, i.e. they pass through a device, e.g. a filter, whose relative gain/frequency characteristic is an increasing function of frequency.

It is well known that this operation causes a widening of the signal variation range which depends on the form of that signal, but which can be intentionally limited, e.g. by means of a double limiter, while taking care not to introduce excessive distortion by this double limitation (these distortions not being compensated at the receiver).

For an initial variation range of the signal $k1$ $(R-Y)$ and $k2$ $(B-Y)$ extending from $-1$ to $+1$, the variation range of the pre-emphasized signals is limited, for example, to the interval $-2$ to $+2$, to which the whole of the frequency swing (range of variation of the instantaneous frequency of the sub-carrier) is made to correspond.

The identification signal $a=a1=-a2$ is then taken at a maximum level equal to 2 or nearly 2.

The transmitter circuit may be designed so that only the colour signals A1 and A2 will be pre-emphasized; one may also simply subject the identification signals to pre-emphasis, like the picture signals, in the output channel of the transmission switch. In this case double limiting suppresses any peaks of these signals exceeding level 2.

Figure 3:
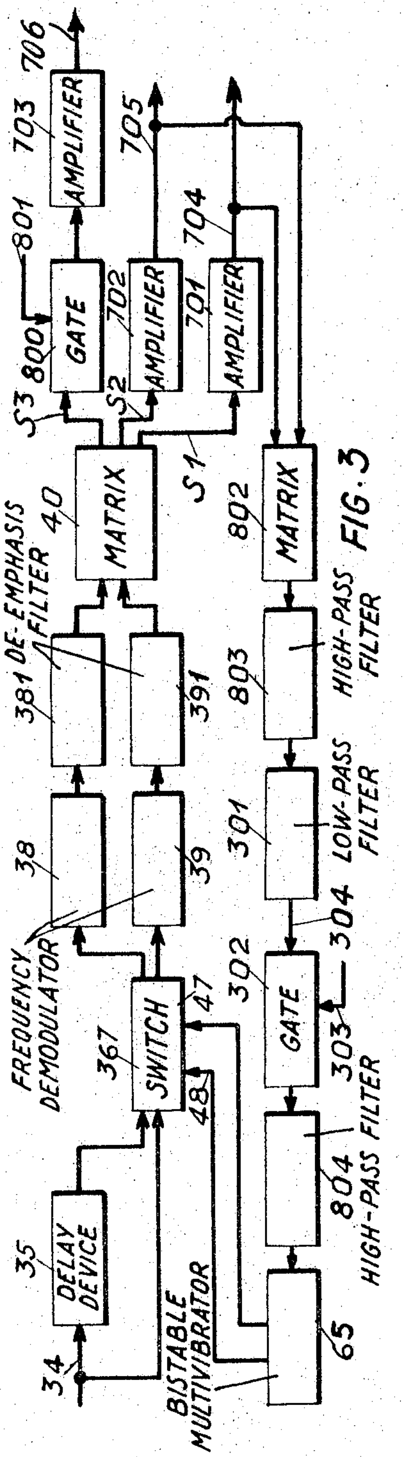
FIG. 3 illustrates an embodiment of a receiver circuit according to the invention.

FIG. 3 illustrates one mode of realization of the sub-carrier utilization circuits in a receiver improved according to the present invention.

In FIG. 3, receiver input 34 receives the sub-carrier and its modulation spectrum, e.g. isolated after detection of the carrier.

This input 34 feeds a channel 35 delaying by T (reciprocal of the line frequency) the signals propagated therethough and a direct channel shown schematically by a single connection.

This arrangement provides for the reptition of the signals A1 and A2 and makes them simultaneous, the delayed signals arriving from channel 35 and relative to the previously transmitted picture line being assimilated to the signals relative to the line being transmitted.

The outputs of the direct channel and of the delay channel respectively feed the two signal inputs of a complex switch 367 whose purpose is to direct respectively on its first output, connected to a frequency demodulator 38, the signals A1 and the corresponding delayed signals, and on its second output, connected to a frequency demodulator 39, the signals A2 and the corresponding delayed signals. Switch 367 has two control inputs 47 and 48.

The factor $k1$ of the signal $A1=k1(R-Y)$ being negative, demodulator 38 is so connected that it reverses the polarity of the demodulated signal i.e. so as to supply the signal $-A1$ of the same polarity as $R-Y$, while demodulator 39 supplies the signal A2 of the same polarity as $B-Y$.

The signals from the frequency demodulators 38 and 39 are subjected to a de-emphasis, compensating for the pre-emphasis applied on transmission, in the de-emphasis filters 381 and 391. The signal $-k1(R-Y)$ and $k2(B-Y)$ are restored at the output of these filters, practically with the variation range of $-1$ to $+1$.

The identification signals suffer distortion which differs according to whether they have been pre-emphasized or not in the transmitter, but the levels of the smaller parallel sides of the trapeziums, remain fixed at $+2$ or $-2$.

This being so, the de-emphasis filters 381 and 391 feed a matrix 40 which delivers at its outputs S1, S2 and S3 respectively, during the active line periods (corresponding to the transmission of picture signals) of the active field periods the signals $R-Y=(-A1)/(-k1)=A1/k1$; $B-Y=A2/k2$ and $G-Y$, the latter being a linear combination of the other two. During checking periods, outputs S1 and S2 consequently deliver signals $a1/k1$ and $a2/k2$, provided of course that the reception switch is in the correct phase with respect to the transmitter switch, i.e. is in the same state as the transmitter switch. When such is not the case, outputs S1 and S2 deliver respectively signals $a2/k1$ and $a1/k2$ during the checking periods.

In other words, $-k1$ and $k2$ being positive, $a1$ and $a2$ being respectively positive and negative, outputs S1 and S2 both deliver negative signals if the reception switch is in the correct phase and positive signals in the opposite case; in both cases these signals have a trapezoidal shape with an extensive upper (or lower) level.

From the express for $(G-Y)$ as a function of $(R-Y)$ as a function of $(R-Y)$ and $(B-Y)$ there results that during the checking periods the signal supplied by output S3 is always of opposite sign to that of the signals supplied by outputs S1 and S2.

It is thus seen that, when the receiver switch is in the correct phase, only output S3 delivers a positive signal during the checking periods.

In order to prevent this positive signal from giving rise to a spurious pattern on the receiver screen, a gate is inserted at output S3, which receives at its control input 801, in the course of vertical blanking intervals, at least during transmission of the identification signals, a blocking signal which is easily obtained from the three-colour tube beam deflection signals.

No gates are inserted at outputs S1 and S2 because those latter outputs deliver negative and consequently non-perturbing signals, when the receiver switch is in the correct phase, and because what happens on the screen when the receiver switch, incidentally, is not in the correct phase may be disregerded.

Outputs S1 and S2 of matrix 40 and the output of gate 800 are respectively connected to the inputs of three amplifiers 701, 702 and 703 whose outputs are 704, 705 and 706.

Signals $R-Y$, $B-Y$ and $G-Y$ collected at the outputs of amplifiers 701, 702 and 703 are used, together with the luminance signal, for the colour picture reproduction according to known art.

In the present case the test signal is collected here, not, according to known art, at an output of one of the de-emphasis filters 381 and 391 or of matrix 40 but at the output of an auxiliary matrix 802, with two inputs respectively connected to the outputs of amplifiers 701 and 702.

So during the checking periods this matrix receives input signals Q1 and Q2 which, if the receiver switch is in the correct phase, are respectively equal to $$Q1=a1/k1$$
$$Q2=a2/k2$$

and in the opposite case $$Q1=a2/k1$$
$$Q2=a1/k2$$

In those expressions the common factor resulting from the common gain of amplifiers 701 and 702 has been ignored.

The parameters of matrix 802 are such that it carries out on its input signals the operation:

$$Q=k1\cdot Q1-k2, Q2$$

If the reception switch is in the correct phase:

$$Q=a1-a2=2a \text{ (positive)}$$

and in the opposite case:

$$Q=a2-a1=-2a \text{ (negative)}$$

In both cases, signals Q are trapezoidal signals whose smaller parallel sides have a level, whose absolute value is high with respect to the maximum levels of picture-signals A1—A2 or A2—A1 which are supplied by matrix 802 during the active field periods.

The output signal from matrix 802 is the same, apart from the amplifier gains, as that which would be obtained by combining in the same proportions the signals supplied by outputs S1 and S2 of matrix 40, but it is clearly useful to take advantage of the gain of amplifiers 701 and 702.

Apart from this gain factor, this same combination Q can also be realized by means of matrix, built up by a simple adder whose two inputs would be fed, with a sign reversal, with the output signals from the deemphasis filters 381 and 392, the resulting signal would then be directly:

$$a1-a2=2a$$

or $$a2-a1=-2a$$

depending on whether the phase of the reception switch is correct or not: (this adder would be replaced by a subtractor if $k1$ and $k2$ were both positive, since none of the demodulators would then reverse the sign of the modulating signal).

When the test signal is obtained in this very simple way, the advantage of the combination which supplies the test signal is immediately clear.

When a spurious component is present at input 34 of the sub-carrier utilization circuit, this component, generally gives rise (in particular when the spurious component consists of a sinusoidal oscillation, e.g. the carrier frequency of a transmitter) after discrimination, to two signals which cancel out in the output signal of the matrix.

It should be noted that the attenuation of the effects of noise signals on the test signal is not limited to the case of a spurious signal of this simple type.

It is sufficient in order that its effects should be considerably attenuated, that the spurious signal should not vary too much from one checking period to the next one.

A compensation also takes place for spurious signals appearing outside of the checking periods if the matrice used for supplying the test signal remains coupled to the outputs of the receiver switch outside of the checking periods, as is the case in the described examples.

The collected test signal is therefore much more reliable than the test signal collected at one only of the outputs of the reception switch or at one only of the outputs of matrix 40, or at the output of one only of amplifiers 701 to 703.

This advantage of the combination remains if, as shown in FIG. 3, action is taken on the output signals of amplifiers 701 and 702, for the signal supplied by the output of de-emphasis filter 381 is divided by $-k1$ in matrix 40 and is multiplied by $k1$ in matrix 802. Similarly, the signal supplied by the de-emphasis filter 391 is divided by $k2$ in matrix 40 and is multiplied by $-k2$ in matrix 802. These combined operations maintain the compensation obtained at the output of the de-emphasis filters.

The essential advantage results from the combination described. A secondary advantage, that of obtaining the comparison signal at a higher level, is obtained by using the output signals from amplifiers 701 and 702.

But this secondary advantage requires a further precaution if amplifiers 701 to 703 do not transmit the DC component.

They are in this case followed by devices for restoring this DC component.

In the case of mere restoration of the DC component, it is of course possible to extract the signals feeding matrix 802 at the output of such devices.

But they will normally be associated with means for adjusting the action of the three-colour tube, said adjustment bringing about an arbitrary variation of the DC component of the signals making up the test signal, and this variation being liable to disturb the operation of the test signal utilization devices.

One solution consists in using, even when they do not transmit the DC component, the output signals from amplifiers 701 and 702 for obtaining the test signal, and effecting a correction. In this case, the output signals from amplifiers 701 and 702 during checking periods are not in fact without a DC component, but they contain a "false" DC component which depends on the picture contents of the previously scanned field.

This "false" DC component can be eliminated by means of a high-pass filter.

With a correctly adjusted cut-off frequency, this filter can suppress this DC component and yet be capable of transmitting the trapezoidal signals which form the test signal, on account of the fact that, as shown in FIG. 1, the time interval between the start of a vertical blanking interval and the start of the associated checking period is distinctly longer than the duration of the checking period.

FIG. 3 shows the conditions just set down, and matrix 802 is followed by a high-pass filter 803 of the type mentioned.

The signal collected at the output of high-pass filter 803 is applied to a low-pass filter 301, whose cut-off frequency is taken on the one hand sufficiently low to eliminate in a very large degree the influences of the noise components which may subsist in the output signal of matrix 802, and on the other hand sufficiently high for allowing the transmission, with a sufficiently high amplitude, of the positive or negative crests of the test signal supplied by matrix 802.

The output of filter 301 is connected to the control input 304 of a gate 302. This gate receives at its signal input 303 line frequency pulses, preferably line fly-back pulses supplied by the receiver sweep circuits.

Preferably a diode is inserted in series with filters 803 and 301 so as to block the transmission of signals of the correct polarity.

Gate 302 is so arranged that it is open so long as the signal applied to its control input is algebraically higher than a level $-Vo$, so chosen that it is quickly reached on the appearance of a negative test signal, but not reached when picture signals are transmitted.

Those two conditions are compatible since signals A1 and A2, after de-emphasis, cannot reach amplitudes comparable to those which correspond to the smaller parallel side of the trapezoidal signals $a1$ and $a2$.

Consequently, gate 302 will always be open except on the arrival of a negative test signal.

If the gate is open, the pulses applied at input 303 then pass through gate 302 normally, and, preferably through a high-pass filter 804 whose purpose will be explained further on, and cause the changes of state of a switching signals generator 65, e.g. a bi-stable multivibrator with two outputs, whose output signals are applied to the two control inputs 47 and 48 of switch 367.

When the test signal is negative, the output signal of filter 301 quickly reaches the level $-Vo$ so closing gate 302, and the next horizontal fly-back pulse (appearing between two successive trapezoidal signals) finds the gate closed. Multivibrator 65 misses a change of state and switch 367 is returned to its correct phase, i.e. the trapezium following the line fly-back pulse stopped by gate 302 is positive. The constants of the circuit are so chosen that the output signal of filter 301 quickly rises (algebraically) above level $-Vo$ during an active line period (time interval comprised between two horizontal blanking intervals).

The purpose of the high-pass filter, which in any case is an optional element in the circuit, is as follows:

The filtered test signal is used as control signal for gate 302. It is desirable that it shall have no effect on the output signal of gate 302. High-pass filter 804 avoids complicating the structure of the gate with this in view, for, since the test signal has been submitted to a low-pass filtering, it no longer contains higher frequencies. So high-pass filter 804 can be devised to block any "leakage" of the gate control signal which may have occurred through the gate, while allowing a passage for the short line frequency pulses.

Concerning this circuit arrangement two further remarks may be made:

(1) Matrix 802 can be so chosen that, if desired, the test signal shall have a positive instead of a negative polarity, for incorrect phase of the reception switch. All that is required in that it shall perform on its input signals the operation:

$$Q=-k1\cdot Q1+k2\cdot Q2$$

(2) The two filters 803 and 301 may be substituted by a band-pass filter.

Figure 4:
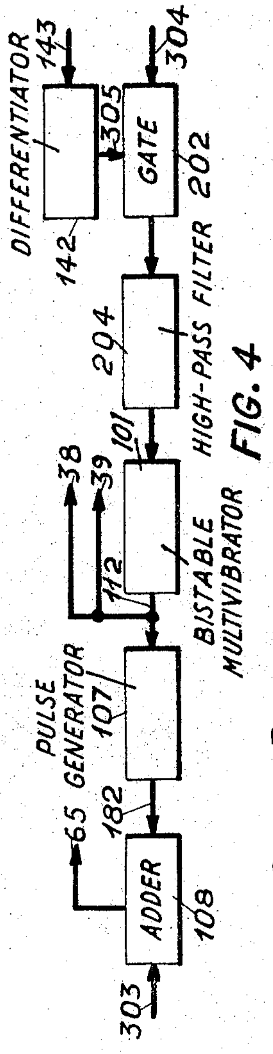
FIG. 4 partially illustrates a variation of the circuit of FIG. 3.

FIG. 4 shows a variation of the receiver, wherein the switch control circuit is combined with a colour-killer i.e. a circuit for blocking the colour channel, at least during the active field periods, when black and white, or achrome, television signals are received. In this case, the composite video-signal does not include a subcarrier and the output signal of matrix 802 is substantially zero, and the signal delivered by this matrix during the time intervals corresponding to the checking periods when a colour television signal is transmitted will be considered as a test signal of zero level.

Of course, this signal is not mathematically zero, but it can reach only low values, and this is still more true of the signal collected at the output of filter 301.

FIG. 4 shows only the parts modified with respect to those of FIG. 3. Input 304 receives the test signal supplied by filter 301 of FIG. 3, and obtained as in the case of the circuit of FIG. 3, except that the diode which may be inserted in series with filters 803 and 301 should now block the transmission of the signals of the incorrect polarity.

At 101 is shown a colour-killer bistable multivibrator, preferably of the Schmitt type. This multivibrator supplies at its output 112 a signal whose level depends on the state of the multivibrator and is used as variable bias for blocking and opening the colour channel. This variable bias can be applied, for example, on each output channel of the receiver switch, in particular on amplifiers or on the limiters (e.g. transistor limiters) included in the frequency demodulators 38 and 39.

"0" and "1" will be used to designate the two states of multivibrator 101 respectively corresponding to blocking and opening of the colour channel.

Further, output 112 of multivibrator 101 also controls a device 107 which supplies a pulse when and only when multivibrator 101 changes from state "1" to state "0."

An adder circuit 108 is provided with two inputs, one of which, 203, receives the line frequency pulses (e.g. line fly-back pulses supplied by the receiver) whose purpose is to trip normally at this frequency the bistable multivibrator 65, used as a switching signal generator (FIG. 3).

Those are then the line frequency pulses which, in the circuit of FIG. 3, were applied to the signal input 303 of gate 302. For this reason this circuit input has also here been designated by 303.

The second input 182 of device 108, connected to the output of device 107, permits the insertion of the pulses produced by the latter in the regular sequence of the line fly-back pulses.

The output of device 108 is connected to the control input of multivibrator 65 (FIG. 3).

The control device of multivibrator 101 includes a gate 202 whose control input is the abovementioned input 304, and whose signal input is fed as follows:

The field fly-back pulses obtained, like the aforementioned line frequency pulses, in the receiver sweep circuits, are applied to input 143 of a differentiator 142 which, for each field fly-back pulse, supplies a pair of pulses J1 and J0 of opposite polarities respectively corresponding to the start and end of the field fly-back pulse.

Pulse J1 is thus generated during portion A (FIG. 1) of that part of the vertical blanking interval preceding the checking period, i.e. the appearance of the test signal, while pulse J0 is generated when the test signal is present. Those conditions are fulfilled with the diagram of FIG. 1, and can always be complied with by means of suitable delay means, delaying for example the test signal or the pair of pulses J1, J0, so that at the inputs of gate 202, J1 precedes the test signal while J0 appears in the course of the duration of the test signal (preferably towards the end than towards the beginning thereof).

If these pulses J1 and J0 pass through gate 202 they are successively applied to the colour-killer multivibrator 101, preferably through the high-pass filter 204 which plays the same part as filter 804 in the circuit of FIG. 3.

The respective polarities and the levels of the pulses J1 and J0, on the one hand, and multivibrator 101, on the other, can always be so determined that application of pulse J1 to multivibrator 101 causes it to change, if not already there, to its state "1" corresponding to the opening of the colour channels, and that application of pulse J0 to multivibrator 101 shall cause it to change, if not already there, to its state "0" corresponding to the blocking of this channel. In particular the proper respective polarities of J1 and J0 can be obtained by applying with the proper polarity the field fly-back pulses to differentiator 142.

With a view to simplifying the description, it will be assumed here that J0 is negative and J1 positive.

Like gate 302 of the circuit of FIG. 3, gate 202 is normally open. But contrarily to gate 302 (which closed only for a test signal of "incorrect polarity"), it closes only for a test signal of "correct polarity."

Also, as gate 302 of FIG. 3, gate 202 is so designed that the level required to close it can be reached only during checking periods.

During each field blanking interval multivibrator 101 will always be returned, if not already there, to state "1" by pulse J1 which will always find gate 202 open.

It will remain in that state if the test signal supplied by input 304 is at a sufficiently high level and is of the "correct" polarity (which also implies that the transmission then taking place is a colour television transmission) for, in this case, gate 202 will be closed on the arrival of pulse J0 which will not reach the multivibrator. This action will be repeated at each vertical blanking interval so long as the phase of the reception switch is correct.

If the received transmission is in fact a colour television transmission, but if the phase of the reception switch is incorrect during a checking period, pulse J0 will reach multivibrator 101 which will change to state "0." The change from state "1" to state "0" of multivibrator 101 will generate a pulse by circuit 107, a circuit which may be, for example, built up by a differentiating circuit combined with a diode connected to let through at the output of device 107 only pulses of the proper polarity.

The pulse supplied by device 107 is inserted in adder 108 in the regular sequence of line frequency pulses applied at input 303 of that adder.

The arrangement of FIG. 4 can always be so adjusted that the additional pulse supplied by device 107 does not coincide in time with a pulse of the regular sequence. This is easily done since multivibrator 101 can change from state "1" to state "0" only at a predetermined instant of the vertical blanking intervals.

This additional pulse causes an additional change-over of multivibrator 65, and rephasing of switch 367 (FIG. 3).

During the next checking period, the conditions are the same as in the first case (colour transmission with correct phase of the reception switch) and colour-killer multivibrator 101 returns to state "1" and remain there.

It should be noted that the process just described involves undesired colour killing in the receiver during an active field, but this being only incidental, and that, for a small fraction of a second, it is of no practical importance.

It may also be noted that it would amount to the same result if pulse generator 107 supplied a pulse when multivibrator 101 passes from state 0 to state 1 (instead of from state 1 to state 0); the rephasing of the switch would be delayed, but this delay would be unimportant, the more so as it would correspond to a time period during which the colour channel is blocked.

Lastly, in the case of black-and-white transmission, gate 202 allows pulse J0 to pass regularly, so causing colour killing in the receiver for all the active field periods. The phase of the reception switch is then immaterial.

The circuit described by means of FIG. 4 is particularly reliable inasmuch as it combines, in gate 202, the action of a test signal which is in a very large measure unaffected by noise, and of an auxiliary signal at the field frequency (built up by pulses J1 and J0) which is itself very precise and reliable.

Contrarily (disregarding the gates, such as 800 to be preferably inserted at the outputs of matrix 40) to the circuit of FIG. 3, the circuit of FIG. 4, such as described, can only be applied in the very general case where a checking period is included in each vertical blanking interval and if the transmitter switch passes regularly from one state to the other at the line frequency, at all time, i.e. including in those portions of the vertical blanking intervals preceding the checking periods.

The invention is not limited to the described examples.

In particular, it will be noted that the device remains applicable if a single identification signal $a1=a$ is transmitted. All that is required is to note that the second identification signal is $a2=0$.

The invention can, of course, be also applied to the receivers in which repetition of signals A1 and A2 occurs after demodulation of the subcarrier.

What is claimed is:

1. A receiver adapted to operate in a colour television system wherein the composite video signal comprises a luminance signal and a subcarrier which, during the active field periods, is alternately modulated by two colour signals A1 and A2 alternating at the line frequency, and which, during checking periods, each of which is included in a vertical blanking interval, is alternately modulated by two auxiliary signals, $a1$ and $a2$, designated identification signals, alternating at the line frequency, each of said identification signals being identical to itself for any two line periods of the checking periods, and the two identification signals being such that the difference $a1-a2$, throughout a line period, has a single polarity; the selective transmission of A1 and A2 during the active field periods, and of $a1$ and $a2$ during the checking periods, being effected respectively in synchronism with the first state and second state of a transmitter switch passing regularly from one state to another at least between the beginning of each checking period and the end of the next active field period, said receiver comprising: a colour channel fed with said subcarrier, said colour channel being subdivided into two channels having a common input and respective outputs, one of said two channels, designated delay channel, comprising a delay device imparting to the signals propagated therethrough a delay, equal to the duration of a line period, relatively to the signal propagated through the other of said two channels, designated direct channel; a receiver switch having two signal inputs respectively coupled to said outputs of said direct and delay channel, at least one control input, and a first and a second output respectively assigned to colour signals A1 and A2; said receiver switch, during the active field periods, directing signal A1 to its first output and signal A2 to its second output or vice versa according to whether it is or it is not in the same state (i.e. first state or second state) as the transmitter switch; a matrix having two inputs respectively coupled to the outputs of said receiver switch and an output, said matrix being designed to supply, during said checking periods, a signal referred to as a test signal, which is either of the form $k(a1-a2)$ or of the form $-k(al-a2)$, where $k$ is a factor having a predetermined sign, according to whether the receiver switch is or is not in the same state as the transmitter switch; and a receiver switch controlling circuit, having an input coupled to the output of said matrix, said switch controlling circuit comprising first means for causing the receiver switch to pass regularly from one state to another at the line frequency, and correcting means controlled by said test signal for, between the beginnings of two successive checking periods, either leaving the action of said first means to proceed unimpaired, or on the contrary modifying this action, according to whether, at the beginning of the first of said two successive checking periods, the test signal has the polarity, designated correct polarity, of signal $k(a1-a2)$ or the reverse polarity, designated incorrect polarity.

2. A receiver as claimed in claim 1, said receiver comprising a first and a second amplifier having respective inputs respectively coupled to said first and second output of said receiver switch, for respectively delivering, during the active field periods, when said receiver switch is in the same state as said transmitter switch, two signals respectively proportional to $A1/k1$ and $A2/k2$, where $k1$ and $k2$ are two constants, and wherein said inputs of said matrix are respectively coupled to said outputs of said two amplifiers.

3. A receiver adapted to operate in a colour television system wherein the composite video signal comprises a luminance signal and a subcarrier which, during the active field periods, is alternately modulated by two colour signals A1 and A2 alternating at the line frequency, and which during checking periods, each of which is included in a vertical blanking interval, is alternately modulated by two auxiliary signals, $a1$ and $a2$, designated identification signals, alternating at the line frequency, each of said identification signals being identical to itself for any two line periods of the checking periods, and the two identification signals being such that the difference $a1-a2$, throughout a line period, has a single polarity; the selective transmission of A1 and A2 during the active field periods, and of $a1$ and $a2$ during the checking periods, being effected respectively in synchronism with the first state and second state of a transmitter switch passing regularly from one state to another at least between the beginning of each checking period and the end of the next active field period, said recevier comprising: a synchronizing and sweep circuit; a colour channel fed with said subcarrier, said colour channel being subdivided into two channels having a common input and respective outputs, one of said two channels, designated delay channel, comprising a delay device imparting to the signals propagated therethrough a delay, equal to the duration of a line period, relatively to the signals propagated through the other of said two channels, designated direct channel; a receiver switch having two signal inputs respectively coupled to said outputs of said direct and delay channel, at least one control input, and a first and a second respectively assigned to colour signals A1 and A2; said receiver switch, during the active field periods, directing signal A1 to its first output and signal A2 to its second output or vice versa according to whether it is or it is not in the same state (i.e. first state or second state) as the transmitter switch; a matrix having two inputs respectively coupled to the outputs of said receiver switch and an output, said matrix being designed to supply, during said checking periods, a signals referred to as a test signal, which is either of the form $k(a1-a2)$ or of the form $-k(a1-a2)$, where $k$ is a factor having a predetermined sign, according to whether the receiver switch is or is not in the same state as the transmitter switch; a switching signal generator having at least one output coupled to said control input of said receiver switch; and a controlling circuit for controlling said generator, said controlling circuit comprising a transmission channel having an input coupled to said synchronizing and sweep circuit so as to receive therefrom pulses at the line frequency, and an output coupled to said generator, and a gate inserted in transmission channel, said gate having a control input coupled to the output of said matrix.

4. A receiver as claimed in claim 3, wherein a diode is inserted between said output of said matrix and said control input of said gate, said diode letting through only signals of said incorrect polarity.

5. A receiver adapted to operate in a colour television system wherein the composite video signal comprises a luminance signal and a subcarrier which during the active field periods, is alternately modulated by two colour signals A1 and A2 alternating at the line frequency, and which, during checking periods, respectively comprised in the successive blanking intervals, is alternately modulated by two auxiliary signals, $a1$ and $a2$, designated identification signals, alternating at the line frequency, each of said identification signals being identical to itself for any two line periods of the checking periods, and the two identification signals being such that the difference $a1-a2$, throughout a line period, has a single polarity; the selective transmission of A1 and A2 during the active field periods, and of $a1$ and $a2$ during the checking periods, being effected respectively in synchronism with the first state and second state of a transmitter switch passing regularly from one state to another at least between the beginning of each checking period and the end of the next active field portion, said receiver comprising: a synchronizing and sweep circuit; a colour channel fed with said subcarrier, said colour channel being subdivided into two channels having a common input and respective outputs, one of said two channels, designated delay channel, comprising a delay device imparting to the signals propagated therethrough a delay, equal to the duration of a line period, relatively to the signals propagated through the other of said two channels, designated direct channel; a receiver switch having two signal inputs respectively coupled to said outputs of said direct and delay channel, at least one control input, and a first and a second output respectively assigned to colour signals A1 and A2; said receiver switch, during the active field periods, directing signal A1 to its first output and signal A2 to its second output or vice versa according to whether it is or it is not in the same state (i.e. first state or second state) as the transmitter switch; a matrix having two inputs respectively coupled to the outputs of said receiver switch and an output, said matrix being designed to supply, during said checking periods, a signal referred to as a test signal, which is either of the form $k(a1-a2)$ or of the form $-k(a1-a2)$, where $k$ is a factor having a predetermined sign, according to whether the receiver switch is or is not in the same state as the transmitter switch; a bistable multivibrator having a first and a second state, said multivibrator comprising a control input and an output coupled to the colour channel so as to block it when it is on its first state, and to unblock it when it is in its second state; a differentiator having an input coupled to said synchronizing and sweep circuit to receive therefrom pulses at the field frequency, and an output; a gate having a signal input coupled to the output of said differentiator, a control input coupled to the output of said matrix and an output coupled to the control input of said multivibrator; a correcting pulse generator having an input coupled to said output of said multivibrator, and an output, said correcting pulse generator being so designed as to generate a pulse when, and only when, said bistable multivibrator passes from a predetermined one of its two states to the other; an adder having a first input coupled to said synchronizing circuit to receive therefrom pulses at the line frequency, a second input coupled to the output of said correcting pulse generator, and an output; and a switching signal generator having at least one output coupled to said control input of said switch, and a control input coupled to said output of said adder.

6. A receiver as claimed in claim 5, wherein a diode is inserted between said output of said matrix and said control input of said gate, said diode letting through only signals of said correct polarity.

References Cited

UNITED STATES PATENTS

| | | | |
|---|---|---|---|
| 3,162,838 | 12/1964 | Sauvanet | 178—5.4 |
| 3,267,208 | 8/1966 | Brouard | 178—5.4 |

JOHN W. CALDWELL, *Acting Primary Examiner.*

J. A. O'BRIEN, *Assistant Examiner.*